July 1, 1969 R. M. STEWART 3,453,602

ELECTROCHEMICAL SIGNAL PROCESSING AND STORAGE DEVICE

Filed Oct. 24, 1965 Sheet 1 of 2

INVENTOR.
ROBERT M. STEWART

BY John E. Wagner
ATTORNEY

INVENTOR.
ROBERT M. STEWART

BY John E. Wagner

ATTORNEY

United States Patent Office 3,453,602

Patented July 1, 1969

3,453,602

ELECTROCHEMICAL SIGNAL PROCESSING AND STORAGE DEVICE

Robert M. Stewart, Encino, Calif., assignor, by mesne assignments, to Aerojet-General Corporation, El Monte, Calif., a corporation of Ohio Filed Oct. 24, 1965, Ser. No. 504,898

Int. Cl. G11c *13/00*

U.S. Cl. 340—173 11 Claims

ABSTRACT OF THE DISCLOSURE

An electrochemical computing device employing a continuous ring of material having a passivated surface layer in the presence of a reactive electrolyte. This is a circular version of the well-known Lillie Wire experiment. It is characterized by an input probe at one point of the periphery including two forms of backward waves suppressors and an arrangement of output electrodes which allows the determination of the parity of pulse trains stored on the ring memory.

This invention relates to electrical signal processing apparatus and more particularly to apparatus for short-term storage, delay, conversion between serial and parallel and for determination of the parity of pulse trains of finite length.

*Background of the invention*

In data handling systems, three common types of data processing requirements are pulse storage, serial to parallel conversion and pulse train analysis to determine the parity or "oddness" or "evenness" of the number of pulses in a pulse train. Conventional electronic circuits or electrochemical storage devices such as magnetic core, drum or tape systems have been used successfully for this purpose, each designed to perform a specified function or transformation. I have discovered that these same functions can be performed in simple electrochemical systems.

Through a number of years of research in electrochemical systems, particularly those related to the famous Lillie Iron wire experiment, it has been noted that a pure iron wire when immersed in concentrated nitric acid (50–70%) by weight, produces a passivated surface layer on film. This film remains relatively stable, and when disturbed as by mechanical disruption or by application of an electrical potential across the film, produces a traveling wave along the surface of the film propagated at a rate commonly ranging from 1 to 100 inches per second depending upon a number of factors. The propagating wave is characterized by a local change in surface potential which may be detected as an electrical pulse. Since this electrochemical transmission is relatively slow compared with electrical current conduction, the iron wire-nitric acid system inherently constitutes a rather long or slow delay line or temporary storage device for electrical pulse trains.

It is further recognized that the passivated surface film after triggering is insensitive to further excitation for a limited time, termed the refractory period, which is a function of iron purity, acid concentration and additives, temperature, and electrical "bias" across the surface. I have determined that by controlling these factors, the refractory period (and rate of propagation) of pulses may be controlled to the extent that it is possible to produce a closed iron pulse storage ring of small diameter which propagates waves continuously around the ring for sustained periods of time. This produces an electrochemical delay line of extremely small size and one which can store a pulse without external power supply other than the original triggering pulse. Energy utilized in propagating the wave comes from the local chemical reaction between the iron and nitric acid which eventually is dissipated.

Also with the control of the refractory period of the passivated film, it becomes possible to store more than one pulse, e.g. a pulse train, on a ring and read out the pulse train at a later time which may be seconds, hours or possibly days later. If a single input-output probe or one input and one output probe is used, the device will act as a pulse storage medium. If, on the other hand, a single input probe is used in combination with a number of output probes distributed around the ring, the device constitutes a serial-to-parallel converter.

It is also well known that the refractory period of the passivated film is not absolute but variable, in that portions of the film which have been disturbed more recently, although they may be triggered again, will propagate a wave at a slower rate than portions of the film which have been passive for a longer period of time. As a consequence, I have demonstrated that two or more pulses traveling around a storage ring will travel at slightly different rates until an equilibrium condition is established in which the pulses are equally spaced around the ring. For example, if a second pulse is stored on a storage ring shortly after the previous pulse has been initiated, the second pulse will travel at a slightly slower rate because of the relative refractory property of the film just traversed by the previous pulse. Within a few revolutions, the two pulses will shift in relative position until they are equally spaced or 180° apart. Four such pulses assume 90° spacing, and three pulses assume 120° spacing. This property and the symmetry properties of the associated traveling electrical field allows the use of this invention as a parity (or other integral divisibility) counter, for we can, through the use of appropriately spaced readout electrodes, easily detect the presence of even or odd numbers of pulses.

With this summary of the development of this invention in mind, it is a general object of this invention to produce an improved information processing device.

More specifically, it is an object of this invention to produce a small simple electrochemical information pulse storage device.

Another object of this invention is to produce such a device capable of transforming pulse trains from serial to parallel format.

Still another object of this invention is to produce a simple pulse train parity counter or a divider.

*Brief description of the drawing*

These objects are all accomplished in accordance with this invention which may be understood more fully from the following detailed description and by reference to the drawing in which.

*Detailed description of the invention*

Figures 1, 2A, 2B, 3:
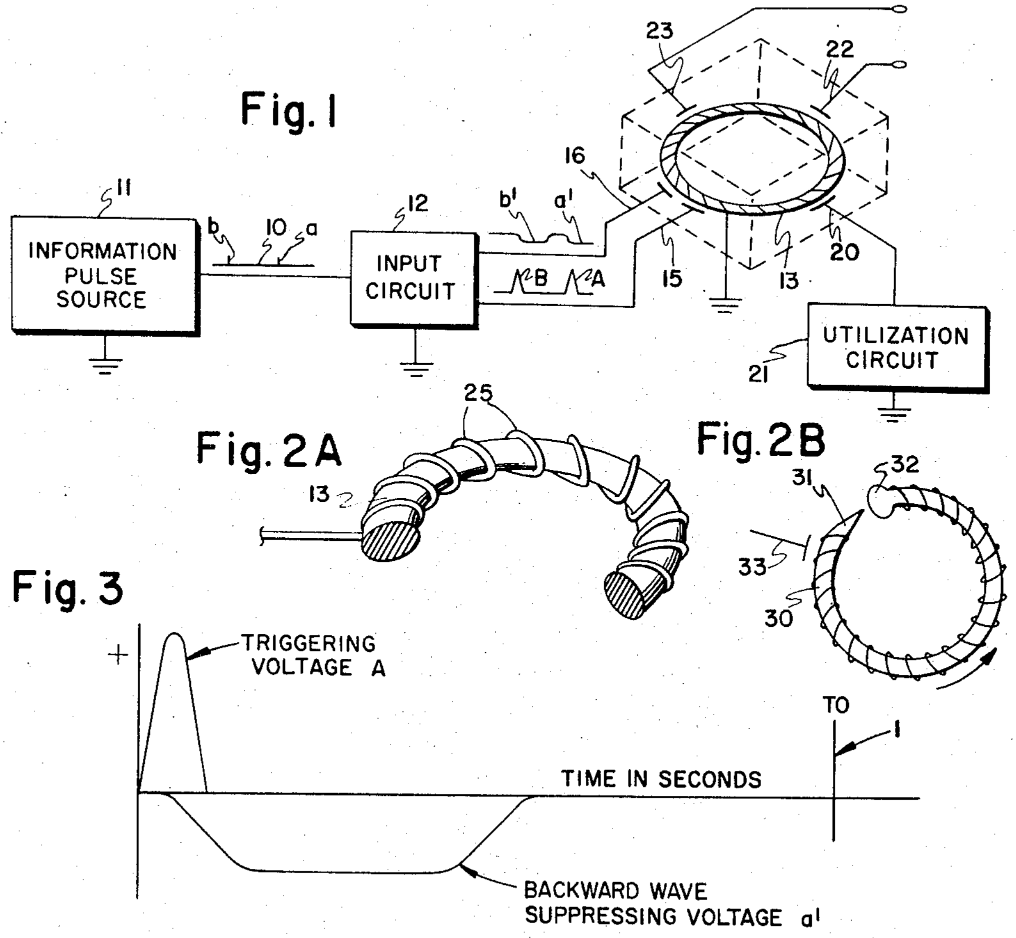
FIG. 1 is a simplified schematic representation of a simple pulse storage system in accordance with this invention.
FIGS. 2*a* and 2*b* are a perspective view partly in section of storage elements useful in the system of FIG. 1.
FIG. 3 is a graphical representation of typical input pulses applied to the storage element of FIG. 1.

Now referring to FIG. 1, the fundamental operation of this invention is illustrated in a pulse delay or storage system in which a train of pulses 10 individually labeled *a* and *b* from a pulse source 11 are introduced into an input circuit 12 which has the function of modifying the train of pulses to allow the introduction into the storage element which is a closed ring 13 of pure (e.g. 99.9%) soft iron totally immersed in an electrolyte or nitric acid of concentration between 50 and 70% by weight maintained at, or above room temperature. The electrolyte and iron ring are enclosed in a housing 14 of suitable configuration and material, such as glass or Teflon. A number of probes or electrodes extend into the housing 40 in spaced juxtaposition to the iron ring 13 to act as input and output electrodes. Probes 15 and 16 positioned side by side constitute the input electrodes, or more correctly pulse input probe 15 is used to initiate a bidirectional wave with each positive polarity amplified pulse identified as A and B while electrode 16 suppresses the backward wave by the application of a local film sustaining field produced by the voltage excursions *a'* and *b'*. As shown in FIG. 1, the pulses *a* and *b* from source 11 amplified in input circuit 12 to produce pulses A and B and inverted, stretched pulses *a'* and *b'* are applied to the storage element 13 resulting in two serial local disturbances of the passivated film traveling in the direction of the arrow. As the first traveling wave passes a probe 20, the local field change in the region of the film is sensed and is passed to utilization circuit 21. The wave produced by the pulse A continues around the closed storage element 13 to be followed by the B wave which is similarly sensed by electrode 20 and passed to the utilization circuit 21.

Two additional similar output electrodes 22 and 23 are positioned around the periphery of the ring to allow readout of the circulating pulses at later instants than the readout by electrode 20. This arrangement is analogous to taps on a delay line. The wave propagation rate and thus the delay is tempertaure sensitive but a typical rate is 2 cm./sec. Closed ring storage elements have been made which circulate a pulse train of several pulses continuously until erased by means hereinafter described or by depletion of the iron and nitric acid.

The number of pulses which may be simultaneously circulated is directly proportional to the circumference, and therefore the diameter of the loop 13 required to handle a specified maximum pulse sequence length is also affected by (1) temperature, (2) pressure, (3) purity of the iron, (4) an electrical "bias" applied across the iron-acid interface, (5) the concentration of the acid or electrolyte, (6) various soluble additives. In order to produce the maximum number of pulses per unit length (i.e. circumference), these factors should be adjusted in the following ways:

(1) operating at slightly elevated temperature (20°–80°);
(2) electrolyte pressure (approximately 100 p.s.i. gauge) or higher as required for bubble suppression and re-recovery stabilization;
(3) 99.9% or greater purity iron;
(4) a slight bias (0.5 v.) across the iron surface film which results in a positive current flow from the interior of the iron to the acid;
(5) $HNO_3$ concentration 53–55% by weight;
(6) for example, a small quantity of $CrO_3$ dissolved in the electrolyte.

These parameters define typical conditions for an information handling ring in accordance with this invention, however the principle may be demonstrated at room temperature and pressure using a 3 mm. wire diameter, 10 cm. ring diameter storage element of 99.5% pure iron helically wrapped with a 1 mm. diameter silver wire at 1 turn per centimeter along the iron to provide a bias battery effect, all immersed in 54% $HNO_3$ in water by weight. From speed and recovery time, measurements made and simple calculations, it is apparent that a ring as small as 1 mm. in diameter can be used for storage of at least one continuously circulating pulse.

The iron ring 13 of FIG. 1 may be more clearly seen as shown in section in FIG. 2*a*. It comprises simply a solid ring of iron 13 around which a helix 25 of silver wire is wrapped. The silver wire being of dissimilar material will, in the presence of the electrolyte, produce with the iron a short-circuited battery or galvanic effect to produce the slight electrical bias in the region of the passivated film on the iron surface. This bias tends to stabilize the film and prevent spontaneous wave formation.

The storage member of FIG. 1 and of FIG. 2*a* are continuous rings thereby allowing continuous circulating waves to be produced and resultant longer pulse storage times than can practically be achieved in linear iron wires. One difficulty in the circular storage member is that upon the stimulation of the passivated film, the resulting wave is propagated in both directions producing two short waves which traverse the ring in opposite directions and obliterate each other upon meeting. For this reason, the input circuit of FIG. 1 is used to produce a backward wave suppressing field. Although this system is satisfactory, the added complexity in the input circuit is undesirable. To trigger a wave, the input circuit need only supply a triggering voltage pulse as shown in FIG. 3, however to insure a unidirectional wave, the input circuit must also supply an opposite polarity pulse of longer direction to the electrode 16.

The leading edge of this backward wave suppressing voltage as is apparent in FIG. 3 is time related to the triggering voltage and its length is greater to insure complete wave quenching. The electronic circuitry to produce these pulses from the information pulse is not sophisticated (an inverter and pulse stretcher for electrode 16 and an amplifier for electrode 15); however, its elimination is desirable.

FIG. 2*b* illustrates a configuration of storage ring which will support only a unidirectional wave and therefore, requires only a simple input circuit. The ring 30 of FIG. 2*b* is discontinuous, but the ends 31 and 32 of the ring are closely juxtaposed and of different size. End 32 is made substantially larger than end 31. In operation, a wave traveling counterclockwise will jump the gap and excite the end 31. On the other hand, waves traveling clockwise are relatively small in size as they reach the end 31 and of insufficient magnitude to excite end 32. Therefore, the ring 30 will only support waves traveling counterclockwise. The input electrode 33 is positioned near the end 31 so that the backward wave travels only a short distance before dying at end 31, while the forward wave continues to circulate.

The choice of a continuous (FIGS. 1 and 2*a*) or a unidirectional ring (FIG. 2*b*) depends upon preference of simplicity of storage element vs. simplicity of input circuit. In complex data systems with a large number of storage elements with a common input circuit, the continuous ring would undoubtedly be used. On the other hand, a system using only one or two storage elements would warrant the use of the discontinuous ring of FIG. 2*b*.

Figure 4:
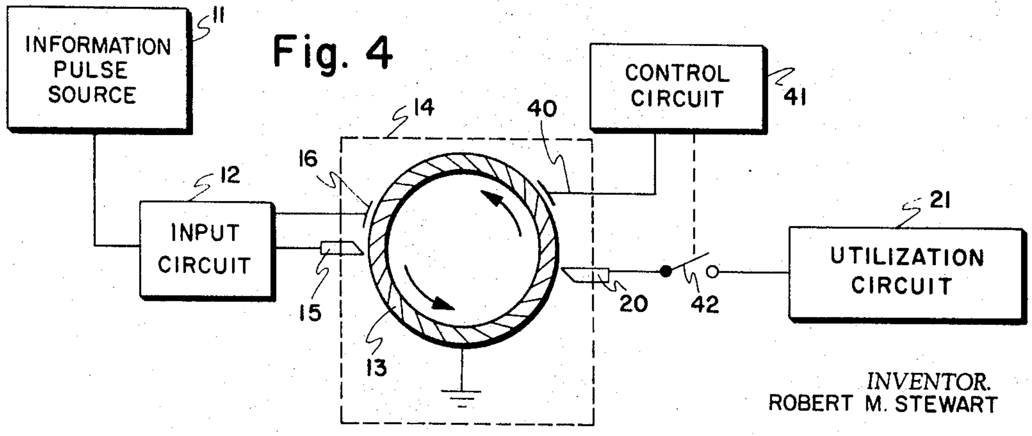
FIG. 4 is a simplified schematic showing of a storage system of the type of FIG. 1, except employing destructive readout of stored pulse.

Incorporating the basic principle of this invention, a number of operational variations are possible. For example, in FIG. 4, the structure of FIG. 1 is modified for buffer storage of pulse trains by the addition of a readout control electrode and control circuit 41 including a switch 42 in the output electrode circuit 20. The input portions of the system operate identically to those of FIG. 1 while the readout control circuit applies a blocking or inhibiting voltage, similar to wave *a'* of FIGS. 1 and 3, to electrode 40 while simultaneously closing switch 42 connecting pickup electrode 20 to the utilization circuit 21. Following readout and annihilation of the pulse train on the ring 13, the control circuit 41 resets the voltage of electrode 40 to zero and opens switch 42. The period of storage of a pulse train may be indeterminate, lasting for as many revolutions of the storage member as may be desired with one limitation that the pulse spacing gradually changes and after a significant length of time, the waves of a pulse train will become equally spaced. This characteristic, constituting a limitation on the application of the storage devices of FIGS. 1 and 4 is actually utilized to advantage in the systems of FIGS. 5 and 7.

Figures 5, 6:
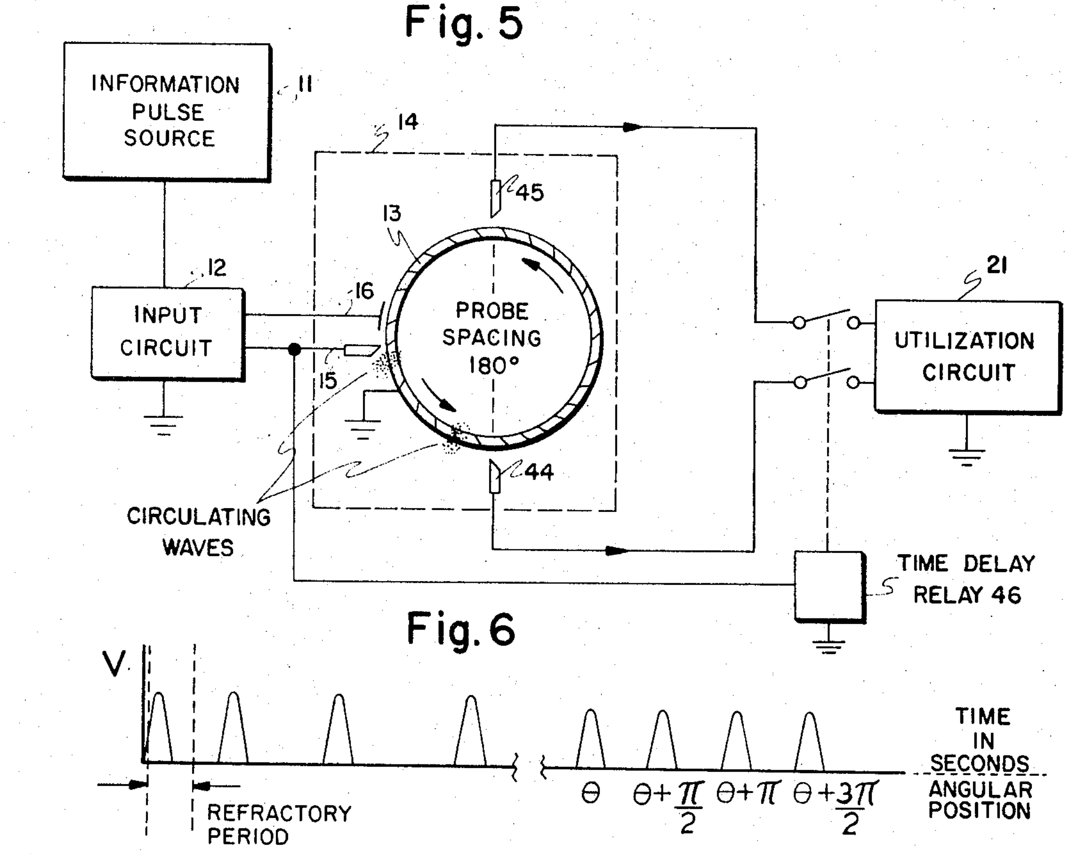
FIG. 5 is a simplified schematic showing of an even parity detector or a "divide-by-two" counter which allows trains of even numbered pulses to be passed to the output.
FIG. 6 is a graphical representation of the pulse spacing equalization phenomenon utilized in the counter of FIG. 5.

In FIG. 5, the information input circuit including pulse source 10, input circuit 11 and probes 15 and 16 are identical to their counterparts of FIG. 1. Two output probes 44 and 45 oppositely disposed are connected through a delay circuit, for example, the contacts 47 and 48 of a time delay relay 49 operated by the input circuit 12. The operation of this device depends upon the unique effect which I have observed that after several revolutions, any train of unilateral pulses launched on the ring will reach a stable wave configuration in which all pulses are equally spaced. After this equilibrium pattern has been reached, then due to the symmetry of an "even" numbered pattern, the potential at two oppositely spaced electrodes near the ring, such as probes 44 and 45, will always be identical and hence no voltage or electrical field will appear across the two probes 45 and 46. If, however, the pattern of pulses is odd in number, a potential difference across the probes will be present and which will alternate polarity. This device has as a primary application an even parity counter or as a "divide-by-two" counter.

The phenomenon employed in the device of FIG. 5 is illustrated in FIG. 6 where an even number (4) of pulses are introduced into the storage ring at unequal time spacing greater than the refractory period. After a number of cycles, the pulses are equally spaced at $\pi/2$ intervals.

Figure 7:
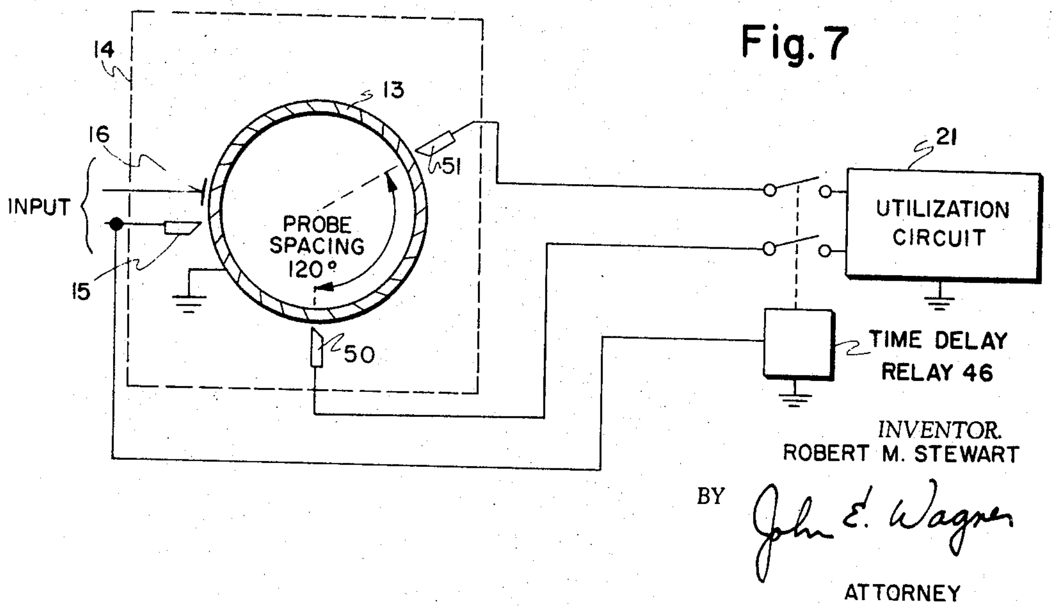
FIG. 7 is a simplified schematic showing of another embodiment of the invention, a "divisible-by-three" detector.

Again this phenomenon is used in the device of FIG. 7 designed to sense odd parity wave trains and to "divide by three." In this case, two output electrodes 50 and 51 are located at 120°–240° spacing around the periphery of the storage ring 13 and connected to utilization circuit 21 via a delay circuit such as the contacts of time delay relay 46 driven from the input circuit. If the number of pulses in a train is divisible by three, they will assume the equilibrium spacing which will necessarily include pulses at 120° spacing. Therefore, pulses will be detected simultaneously on both probes, thereby producing an output signal from the comparator 46. It is apparent that the relative position of the probes 50 and 51 determines the division factor. For example, if probe 51 is moved to a position spaced 90–270° from probe 50, the device will divide by five and will detect the presence of pulse trains divisible by 4.

Any number of information processing systems may easily be devised by obvious extensions of the principles taught herein and by interconnecting the devices in series or parallel as is well known in the computer art. Serial to parallel conversion of pulse trains is simply accomplished by the use of a number of independent output probes equal to the number of bits in the code used.

These variations and others may be made without departing from the spirit and scope of this invention. The monopoly granted under the patent laws of the United States is therefore determined not by the specific embodiments illustrated, but rather by the scope of the following claims and their equivalents.

What I claim is:

1. An information handling device comprising:

an electrloyte;

a storage element immersed in the electrolyte and having the property of producing a passivated film on the surface thereof and of producing a propagating local wave upon the disturbance of the passivated film;

said storage element including a single closed path for such a propagating wave;

means for locally disturbing the passivated film to produce a unidirectional wave on the surface of the storage element;

and means for detecting the passage of a propagating wave;

said last means comprising at least two probes spaced from the film disturbing means and spaced from each other at angular intervals around the periphery of the storage element relating to the parity of the number of pulses to be stored upon the storage element.

2. The combination in accordance with claim 1 wherein the unidirectional wave producing means includes an input signal probe, a backward wave suppressor electrode and means for applying pulses of opposite polarity to the probe and suppressor electrode.

3. The combination in accordance with claim 1 wherein the storage element comprises a discontinuous ring with the ends thereof in space juxtaposition and dissimilar in configuration whereby waves are propagated across the discontinuity in one direction only.

4. The combination in accordance with claim 1 wherein two output probes are equidistantly positioned around the length of the storage element whereby an even number of waves traveling around the storage element under equilibrium may be simultaneously detected by the probes.

5. An information processing device comprising:

a storage element exhibiting the property of producing a passivated surface film in the presence of a reactive surrounding medium, which film has the property of propagating a local disturbance along the surface of the storage element;

the storage element having a single closed loop wave propagation path;

means including the storage element for producing unidirectional propagating waves corresponding to information bits to be stored thereon comprising a pair of input probes positioned adjacent to the storage element and spaced along the wave propagation path and means for applying pulses of opposite polarity to the input probes whereby one of the probes produces two oppositely propagating waves and the second probe extinguishes the backward wave; and means positioned along the periphery of the storage element for detecting the passage of a propagating wave.

6. An information processing device comprising:

a storage element exhibiting the property of producing a passivated surface film in the presence of a reactive surrounding medium, which film has the property of propagating a local disturbance along the surface of the storage element;

the storage element having a single closed loop wave propagation path;

means including the storage element for producing unidirectional propagating waves corresponding to information bits to be stored thereon, said storage element having a discontinuity in the single wave propagation path with the adjacent portions of the storage element having different configurations, whereby the storage element will propagate a wave across the discontinuity in one direction only; and means positioned along the periphery of the storage element for detecting the passage of a propagating wave.

7. The combination in accordance with claim 6 wherein one portion of the storage element adjacent to the discontinuity is of reduced size thereby retarding propagation of the wave.

8. The combination in accordance with claim 7 including an input probe positioned in the region of the reduced portion, whereby backward circulating waves initiated by the input probe are rapidly extinguished before forward propagating waves reach the discontinuity in the storage element.

9. The combination in accordance with claim 1 wherein at least two output probes are spaced around the periphery of the storage element at 120° spacing whereby odd numbers of circulating waves in equilibrium may be simultaneously detected on the probes.

10. The combination in accordance with claim 1 including time delay means operated by the means for producing the unidirectional wave on the surface of the storage element for enabling the output circuit at an interval at a time after the waves on the storage element have reached equilibrium intervals or positions.

11. The combination in accordance with claim 1 wherein two output probes are positioned at 180° intervals around the periphery whereby even parity pulse counts may be detected on the storage element.

References Cited

UNITED STATES PATENTS

| | | | |
|---|---|---|---|
| 2,708,748 | 5/1955 | Straube | 333—30 X |
| 2,854,657 | 9/1958 | Straube | 340—347 |
| 3,311,897 | 3/1967 | Post | 340—173 |
| 3,355,717 | 11/1967 | Cote | 307—201 X |

BERNARD KONICK, *Primary Examiner.*

JOSEPH F. BREIMAYER, *Assistant Examiner.*

U.S. Cl. X.R.

307—201